Jan. 10, 1961                D. C. BALLARD ET AL                2,967,963
                              ELECTRON GUN STRUCTURE
                               Filed April 30, 1957

INVENTORS
DAVID C. BALLARD,
ROBERT J. KONRAD &
RICHARD W. OSBORNE
BY
William A. Zalesak
ATTORNEY

United States Patent Office 2,967,963
Patented Jan. 10, 1961

2,967,963

ELECTRON GUN STRUCTURE

David C. Ballard, Marion, Robert J. Konrad, Jonesboro, and Richard W. Osborne, Marion, Ind., assignors to Radio Corporation of America, a corporation of Delaware Filed Apr. 30, 1957, Ser. No. 656,137

4 Claims. (Cl. 313—82)

This invention is directed to cathode ray tubes and particularly to the electron gun structure used in such tubes.

A cathode ray tube, used either as a picture tube or as an oscillograph tube or for other purposes, utilizes a plurality of electrodes within the tube envelope for forming an electron beam which is swept over a fluorescent screen to provide a visible light-emitting pattern. The electrodes are formed into an electron gun assembly, which derives and forms electrons from a heated cathode electrode into a beam of electrons, which is accelerated toward and focused on the fluorescent screen. The cathode electrode normally consists of a metal tube having one end closed by a continuous metal wall portion. The outer surface of this end wall of the cathode is coated with a thermionic electron emitting material, from which electrons are easily emitted when the cathode coating is heated to an elevated temperature. The cathode is heated by a filament which is positioned within the tubular cathode. During tube operation, an electric current through the heater filament maintains it at incandescence to keep the cathode coating at a thermionic temperature.

The cathode sleeve is supported by a ceramic disk, which is fixed within a cup shaped control grid electrode with the cathode-emitting surface adjacent to and at a pre-determined distance from the end wall of the control grid cup. The cathode support disk also insulates the cathode from the control grid cup, which is normally at a different potential than that of the cathode. Because of the high temperatures to which the cathode is heated, the metal of the cathode tube tends to evaporate and to deposit metal onto the surfaces of the insulating support disk. In time, the evaporated metal forms a conductive path between the cathode and the control grid and tends to short out the cathode electrode.

It is therefore an object of this invention to provide novel means for preventing cathode to control grid shorting during tube operation.

It is another object of the invention to provide novel means for preventing evaporated metal from the cathode from forming a conductive path between the cathode and control grid electrodes in a cathode ray tube.

It is another object of the invention to provide novel means to prevent the formation of a continuous conductive path between cathode and control grid electrodes of a cathode ray tube.

The invention is in the provision of shielding means between the cathode electrode and the exposed surface portions of the insulating disk supporting the cathode. The shielding means consists of a circular groove formed on each side of the insulating cathode support disk in combination with a retainer ring having an edge positioned within one of the circular grooves to shield a continuous portion of the support disk surface from evaporated metal of the cathode.

Figure 1:
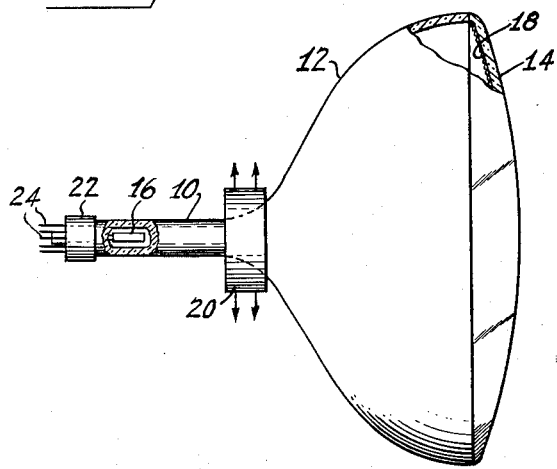
Figure 1 is a partially cut-away view of a cathode ray tube of the type described.

The invention is directed to a part of the electron gun of a cathode ray tube, which may be used as a viewing tube for television or as a tube for providing visible luminescent patterns of different types. For example, Figure 1 shows a cathode ray tube of a type used for viewing television pictures. Such a tube may consist of a glass envelope having a tubular neck portion 10 joined at one end to the small end of a funnel-like bulb portion 12. The other end of the bulb 12 is closed by a glass face plate 14. The opposite end of the tubular portion 10 is hermetically sealed by a stem portion (not shown) supporting an electrode assembly 16 comprising an electron gun. The electron gun is one which includes an indirectly heated cathode electrode as a source of electron emission. Other electrodes of gun 16 form the electron emission from the cathode electrode into an electron beam, which is focused onto the inner surface of the face plate 14, which is coated with a thin film 18 of phosphor material, which luminesces when struck by high energy electrons. The electron beam of the tube is scanned in any desired manner over the surface of the phosphor screen 18 by deflection fields supplied by a yoke element 20 to provide a luminescence pattern visible to the observer. The free end of the tubular envelope neck portion 10 is enclosed in a base 22 supporting a plurality of lead pins 24, which in turn are connected to conductive leads which pass into the tube envelope to connect the several electrodes of gun 16 to external sources of potential (not shown).

Figure 2:
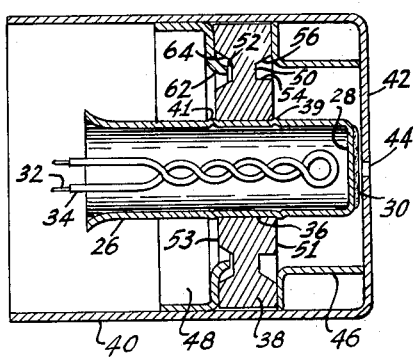
Figure 2 is an enlarged sectional view of a cathode control grid assembly, in accordance with the invention.

Figure 2 shows an enlarged view of the cathode and control grid assembly of electron gun 16 of Figure 1. The cathode 26 is a small tubular electrode closed at one end by a wall portion 28. The outer surface of wall portion 28 is coated with a layer 30 of thermionic emitting material such as a mixture of strontium and barium oxides. This material is well known and is recognized as that which easily emits electrons when heated to high temperatures. Mounted within the cathode electrode is a heater filament 32 which is coated with a layer of insulating material 34 and which is twisted in a coil formation to provide a uni-directional field when it is heated with an alternating current. Cathode sleeve 26 is supported within a central aperture 36 of a ceramic support disk 38 by peripheral beads 39 and 41 pressed out of the wall of the cathode sleeve into contact with opposite surfaces of disk 38. The cathode-ceramic assembly is in turn supported within a control grid-cup electrode 40, closed at one end by a plate 42. At the center of plate 42 is a small aperture 44 through which electrons from the cathode surface 30 will pass.

The cathode coating 30 is maintained at a critical small distance from the inner surface of the control grid wall 42. This is accomplished by using an accurately formed spacer eyelet 46 which is inserted between the ceramic disk and the inner surface of wall 42. To lock the cathode-ceramic assembly within the control grid cup 40, an annular lock washer 48 is pressed inwardly against the adjacent surface of support disk 38 and then is welded to the inner surface of the grid cup 40.

During tube operation, a heating current is passed through filament 32. This current heats the filament to incandescence in order to raise the temperature of the cathode sleeve 26 to a sufficiently high temperature to initiate electron emission from coating 30. This electron emission is urged through the control grid aperture 44 by positive accelerating fields provided by adjacent accelerating electrodes of gun 16. The acceleration of the electrons from cathode surface 30 and the formation of the electrons into an electron beam is not further discussed since it is well known and does not constitute a part of this invention.

Due to the fact that the cathode sleeve 26 is raised to high temperatures during tube operation, and the fact that the cathode ray tube is evacuated, metal from the outer surface of cathode sleeve 26 will be evaporated outwardly and will be deposited on cooler surfaces of adjacent structures. The evaporated metal will thus form a thin conductive film over the exposed surfaces of the ceramic insulator disk 38. If the entire surface is exposed, this conductive film will in time provide a shorting path between the cathode sleeve 26 and the control electrode 40. During tube operation, the cathode is normally operated at a potential difference from the control electrode within a voltage range between $-50$ volts and $-10$ volts, for example. A conductive connection between these two electrodes would prevent their functioning in the manner desired and cause the cathode ray tube to become inoperative.

Accordingly, the ceramic support disk 38 is provided with a circular groove 50 in one surface 51 and a second circular groove 52 in the opposite surface 53. The groove 50 has one side 54 normal to the surface 51 of disk 38 and a side 56 which may be inclined at an angle to the surface as shown. The normal side 54 provides a wall which will shield the bottom of groove 50 from evaporated metal from the surface of the cathode sleeve 26 extending beyond the ceramic surface 51.

The other end of cathode sleeve 26 extending from the lower surface 53 of ceramic disk 38 is longer than the exposed coated end of cathode sleeve 26. This, then, requires that groove 52 be deeper than and/or farther removed from the cathode than groove 50 in order to provide a shielded portion of groove 52 from the evaporated metal.

However, as electron guns are made smaller, the cathode supporting disks, such as disk 38 in Figure 2 are correspondingly made smaller so that the depths of grooves 54 and 52 and their axial displacements from the cathode are limited. In electron guns of the type described, the ceramic disk 38 has a total diameter of 370 mils, or slightly more than ⅓ of an inch. It has been found to be impractical to make both grooves 50 and 52 sufficiently deep or sufficiently removed from the cathode to provide the required shielding effect necessary to maintain insulation between the cathode 26 and the control grid 40.

Therefore, in accordance with the invention, the groove 50 is made sufficiently deep so that the normally disposed wall 54 will provide shielding of the bottom of groove 50 from metal evaporated from the adjacent end of cathode sleeve 26. To provide sufficient shielding of the ceramic disk 38 at its lower surface 53, the retainer ring 48 is formed with a projecting annular lip portion 62 extending into the groove 52 but spaced from the walls of the groove. The annular lip 62 thus provides an additional shielding effect between the wall 64 of groove 52 and the portion of the cathode sleeve 26 extending beyond surface 53 of the ceramic ring 38. The use of the in-turned lip portion 62 of the retainer ring 48 enables the use of a shallower groove 52 in the surface 58 of the cathode support ring. In this manner then, both the upper surface 51 and the lower surface 53 of the ceramic support ring 38 has a continuous annular portion which is shielded from any metal evaporated from the cathode surface. These shielded areas of the support ring surfaces maintain the cathode 26 and the control grid 40 insulated from each other.

Figure 3:
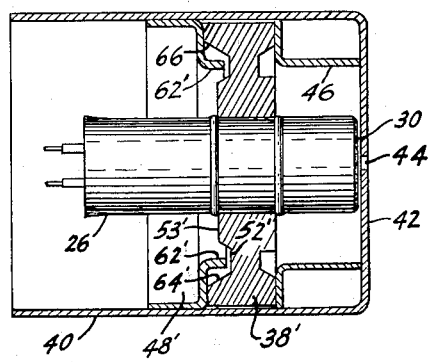
Figure 3 is an enlarged sectional view of a modification of the structure of Figure 2.

Figure 3 shows a modification of the invention of Figure 2 in which the same reference numerals are used for identical structures and prime numbers are used for structures closely related to similar structures in Figure 2. In the modification of Figure 3, the cathode support disk 38' is formed with a pheripheral lip 66 which is thicker than the inner portion of the disk 38'. As compared with the structure of Fig. 2, this then provides the wall 64' of the annular groove 52' with a larger area and enables the use of a retainer ring 48' having a longer shielding lip portion 62'. This modification provides a greater shielded area on surface 64' of groove 52'.

Figure 4:
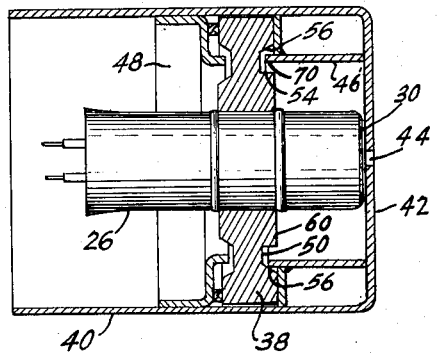
Figure 4 is an enlarged partial sectional view of a further modification of the invention of Figure 2.

If it is found that the shielding effect of wall 54 of groove 50 is insufficient, in accordance with the invention additional shielding means is provided within the groove 50. As shown in Figure 4, the spacer eyelet 46' is formed with an annular end portion 70 extending part-way into groove 50 to form a shield for a portion of wall 56 of groove 50. This extension 70 provides an additional shielded area of the surface of disk 38 which will not be coated by metal evaporated from the cathode surface. Thus, the shielding portion 70 of spacer 46 together with the normally disposed groove wall 54 provide uncoated insulating areas between cathode sleeve 26 and control electrode 40 and thus prevent their becoming shorted during tube operation.

What is claimed is:

1. An electrode assembly for a cathode ray tube, said assembly comprising a pair of coaxially disposed tubular electrodes with one of said pair of tubular electrodes enclosing the other of said tubular electrodes, an insulating annular member fixed between said electrodes, said annular member having in one surface thereof a circular groove extending around said other of said tubular electrodes, and a shielding member fixed to one of said pair of electrodes and fixing said other electrode relative to said one of said electrodes, said shielding member having a circular portion extending within and spaced from the sides of said groove.

2. An electrode assembly for a cathode ray tube, said assembly comprising a tubular cathode electrode, an insulating spacer disk having an aperture therethrough at its center, means mounting said tubular cathode coaxially within said aperture, a tubular control electrode enclosing said cathode electrode and said disk, retaining means fixing said disk at its periphery to said control electrode with said cathode electrode on substantially the same axis as said control electrode, said disk having a circular groove extending in one surface thereof between said cathode electrode and said control electrode, said retaining means including a shielding element having a circular portion extending into and spaced from the walls of said groove.

3. An electrode assembly for an electron tube, said assembly including a pair of electrodes, an insulating member in contact with and spacing said electrodes, a continuous groove in one surface of said insulating member and separating said electrodes, and an element fixed to one of said electrodes and having a portion thereof contacting said insulating member to retain said electrodes in fixed disposition relative to each other, said element including another portion comprising a continuous shield member extending into and spaced from the surfaces of said groove to shield at least one part of the leakage path of said insulating member from material evaporated from said electrodes.

4. An electrode assembly for a cathode ray tube, said assembly including a pair of concentric electrodes, an insulating member in contact with and spacing said electrodes, a circular groove in the surface of said insulating member and dividing said insulating member surface between said electrodes, and a shield member fastening said insulating member and extending into and spaced from the surfaces of said groove to shield at least one part of the leakage path of said insulating member from metal evaporated from said electrodes.

References Cited in the file of this patent

UNITED STATES PATENTS

| | | |
|---|---|---|
| 2,185,807 | Gabor | Jan. 2, 1940 |
| 2,604,599 | Breeden | July 22, 1952 |
| 2,784,334 | Barnett | Mar. 5, 1957 |
| 2,833,952 | Hemphill | May 6, 1958 |
| 2,852,716 | Lafferty | Sept. 16, 1958 |
| 2,891,183 | Barnett | June 16, 1959 |

FOREIGN PATENTS

| | | |
|---|---|---|
| 869,794 | France | Nov. 17, 1941 |
| 893,235 | Germany | Oct. 15, 1953 |
| 721,239 | Great Britain | Jan. 5, 1955 |